April 27, 1937. P. FROLOIS 2,078,843
APPARATUS FOR SUPERSATURATING WITH CARBON DIOXIDE, LIQUIDS SUCH AS WINES
Filed Nov. 4, 1935
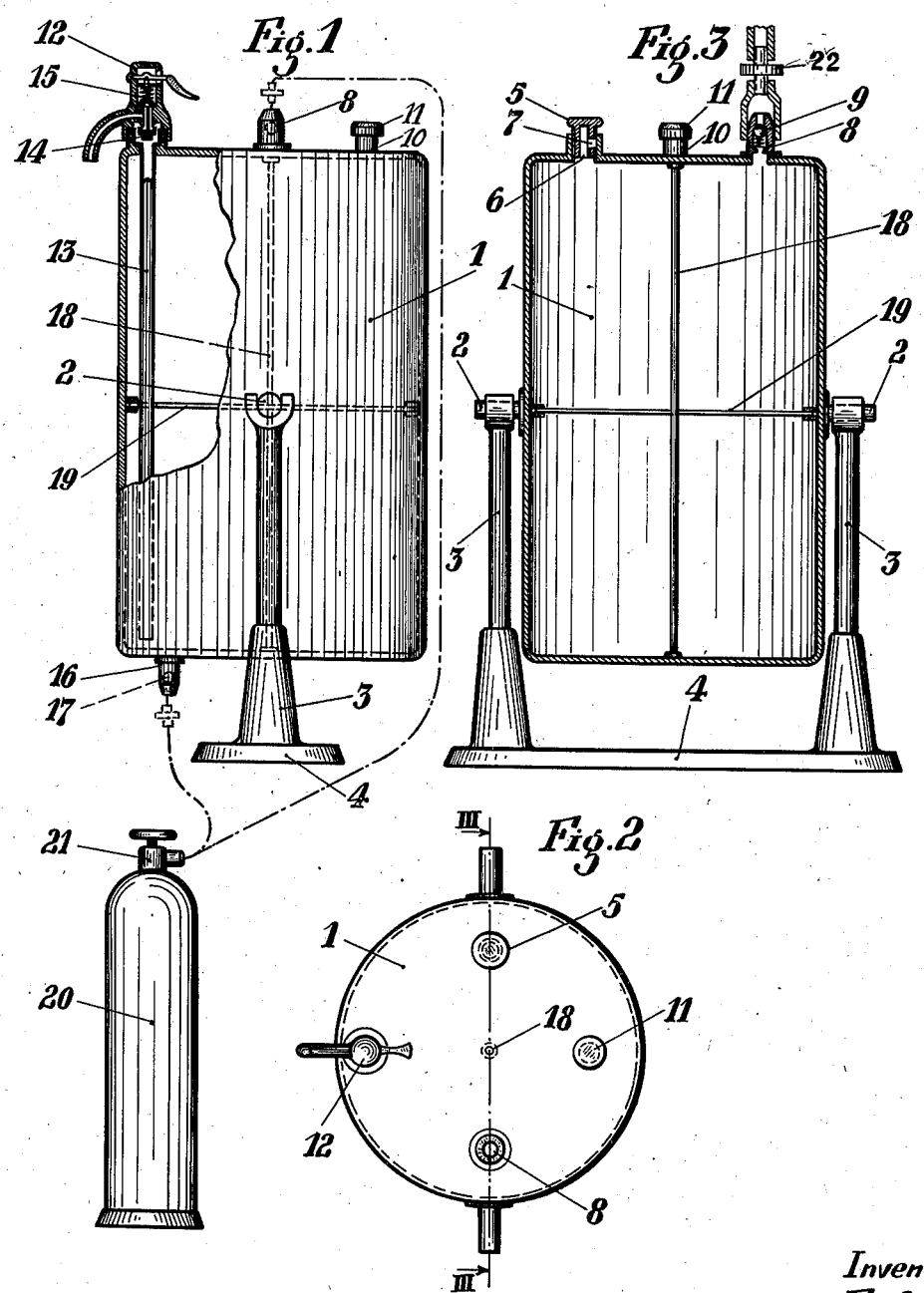
Inventor:
Pierre Frolois
Attorney Patented Apr. 27, 1937

2,078,843

UNITED STATES PATENT OFFICE 2,078,843

APPARATUS FOR SUPERSATURATING WITH CARBON DIOXIDE, LIQUIDS SUCH AS WINES

Pierre Frolois, Brussels, Belgium

Application November 4, 1935, Serial No. 48,257
In Belgium October 21, 1935

7 Claims. (Cl. 261—75)

This invention has for object an apparatus enabling to super-saturate with carbon dioxide, liquids such as wine, and particularly to turn into champagne (sparkling wine) non-sparkling or still wines, to obtain for instance by means of non-sparkling white wine, a wine super-saturated with carbon dioxide and maintained under carbon dioxide pressure.

In this manner it is possible with non-sparkling white wines such as wines of the Champagne region to obtain, nearly instantaneously, a wine with the precise taste and characteristics of sparkling champagne wine obtained by the usual very slow processes of fermentation by the champagne method.

Up to now it has not been possible to artificially manufacture sparkling champagne with a persistant froth, i. e. a champagne in which the froth will hold, because white wine when put in the presence of carbon dioxide, even during a relatively long period, will only absorb a very feeble quantity of carbon dioxide which is set free when the wine has been poured.

Contact of non-sparkling wine with carbon dioxide under high pressure does not either give satisfying results.

According to this invention, a true stable diffusion of carbon dioxide in the wine is effected by spraying or atomizing the wine, placed under a high carbon dioxide pressure, in an atmosphere of carbon dioxide under pressure, whereby a true physical combination of the gaseous and liquid particles is obtained, with the result, thanks to the maintaining pressure in a carbon dioxide atmosphere, of a stable or persistent froth when the wine is poured out and the development of a taste exactly similar to the taste of sparkling champagne wines.

An example of an apparatus for realizing this intimate physical combination is shown in the appended drawing in which:

Fig. 1 is a front view of the apparatus with parts broken away,

Fig. 2 is a top view, and

Fig. 3 is a vertical, diametrical cross-section of the apparatus, along line III—III of Figure 2.

I is a cylindrical tank or reservoir made of glass, metal or other material, perfectly fluid-tight and capable of withstanding a pressure of several atmospheres. This tank is preferably carried by two diametrically opposed journals 2 fixed at midheight. These journals are rotatably lodged in rounded parts at the top ends of legs 3 fixed to a base 4. In this manner it is possible to put the tank in the position shown and to put it in the reversed vertical position, with the object which will be explained hereinafter.

The lid or upper end plate of the tank comprises a valve 5 which can be controlled from outside and allowing to put the interior of the tank in communication with the atmosphere. This valve can be of any kind whatever, with hand grip or wheel, pusher, or preferably of the rotating type, as in the example shown.

In the closed position the valve completely isolates the tank 1, but by rotation it ensures communication with the exterior by means of its central bore 6 and a side port 7. The upper end plate is further provided with a pipe-fitting 8 with a back pressure valve 9 which prevents passage towards the outside. Said plate is also provided with the pipe fitting 10 and closing cap 11, and with the cock 12 provided with a hand-grip and connected through said plate to a tube 13 extending substantially down to the bottom plate.

The cock 12 comprises a spindle 14 which normally closes the exit through the combined action of the spring 15 which can be omitted, and of the pressure inside the tank.

Such cocks or valves are usually provided on the soda-water bottles called "siphons".

The bottom plate comprises only one pipe-fitting 16 with a back pressure valve 17 which prevents passage towards the outside.

A diffuser is fixed in the tank at mid-height, said diffuser, in this example, being formed by means of one or several rigid plates 19 provided with a multitude of exceedingly fine holes through which the considered liquid (wine) could not pass even by capillarity. The two end plates are preferably braced by means of one or several rigid rods 18.

A carbon dioxide supply, for instance a carbon dioxide bottle 20 provided with an expander 21 which can be regulated, is connected to the pipe-fittings 8 and 16, as shown. The valve 5 is then opened and carbon dioxide is introduced in the tank at a pressure of about 1 atmosphere to expel the air contained therein. The valve 5 and gas supply are then closed.

The wine to be treated is afterwards introduced in the tank through pipe-fitting 10 said wine filling up all the top half of the tank, and the fitting 10 is then closed.

Carbon dioxide under pressure is then introduced in the tank at the same time through the pipe-fittings 8 and 16, with the gas pressure regulating means of the usual or conventional construction, such being indicated at 22. The pressure is for instance of 5 to 6 atmospheres or much more and it shall advantageously be slightly less at 16 than at 8. The liquid is thus expelled under pressure through the dividing diffuser 19 and arrives at the lower part of the tank in the state of a very tenuous mist which contacts there with the carbon dioxide under pressure with which it mixes intimately and in a stable manner.

After a certain time, the gas supply is cut off or it is maintained during transfusion of the sparkling wine obtained.

If the result obtained is not perfect, a new diffusion of the liquid can be operated by simply turning over the tank in such a manner as to bring the pipe fitting 16, above.

The pressure at 16 is then slightly raised so as to obtain a higher pressure at the top part.

The liquid diffusing operation is repeated until the desired result is obtained.

Drawing off is effected by means of the siphon-cock 12.

It will be understood that the dividing diffuser 19 may be of any other desired construction than the one mentioned, provided that it ensures a diffusion of the liquid in mist form.

It will also be understood that the apparatus can be used to supersaturate other liquids such as orange juices or even water.

In this last case, the water can be directly supplied under pressure by means of pipe-fitting 8, the pipe-fitting 10 being omitted and owing to the easy saturation of water, the tank 1 can be stationary.

Having now fully described my said invention, what I claim and desire to secure by Letters Patent, is:

1. An apparatus for super-saturating with carbon dioxide under pressure, liquids such as wine and maintaining those liquids under gaseous pressure, comprising a fluid-tight pressure resisting tank or reservoir, an inlet for carbon dioxide under pressure at the upper part, another inlet for carbon dioxide under pressure at the lower part, means for regulating the pressure at will, at each of these inlets, a closable pipe fitting at the upper end plate for introducing liquid in the tank and a diffuser plate which divides the tank in two equal superposed parts and which is capable of dividing the compressed liquid throughout the area of the plate into a fine cloud or mist for intimately mixing with the dioxide introduced there.

2. An apparatus for super-saturating with carbon dioxide under pressure, liquid such as wine and maintaining those liquids under gaseous pressure, comprising a fluid-tight pressure resisting tank or reservoir, an inlet for carbon dioxide under pressure at the upper part, another inlet for carbon dioxide under pressure at the lower part, means for regulating the pressure at will, at each of these inlets, a closable pipe fitting at the upper end plate for introducing liquid in the tank, a diffuser which divides the tank in two equal superposed parts and which is capable of dividing the compressed liquid into a fine cloud or mist for intimately mixing with the dioxide introduced there, the upper end plate of the tank bearing a cock with hand grip, connected to a tube extending as far as the bottom end plate to draw off super-saturated liquid.

3. An apparatus for super-saturating with carbon dioxide under pressure, liquids such as wine and maintaining those liquids under gaseous pressure, comprising a fluid-tight pressure resisting tank or reservoir, an inlet for carbon dioxide under pressure at the upper part, another inlet for carbon dioxide under pressure at the lower part, means for regulating the pressure at will, at each of these inlets, a closable pipe fitting at the upper end plate for introducing liquid in the tank, a diffuser which divides the tank in two equal superposed parts and which is capable of dividing the compressed liquid into a fine cloud or mist for intimately mixing with the dioxide introduced there, the upper end plate of the tank bearing a cock with hand grip, connected to a tube extending as far as the bottom end plate to draw off super-saturated liquid and a valve which can be operated from outside to momentarily put the inside of the tank in communication with the exterior.

4. An apparatus for super-saturating with carbon dioxide under pressure, liquids such as wine and maintaining those liquids under gaseous pressure, comprising a fluid-tight pressure resisting tank or reservoir, and manually controlled by atmospheric vent to the tank, an inlet for carbon dioxide under pressure at the upper part, another inlet for carbon dioxide under pressure at the lower part, these inlets comprising a non-return valve which does not allow passage towards the outside, means for regulating the pressure at will, at each of these inlets, a closable pipe fitting at the upper end plate for introducing liquid in the tank and a diffuser which divides the tank in two equal superposed parts and which is capable of dividing the compressed liquid into a fine cloud or mist, towards the lower half of the tank where it will intimately mix with the dioxide introduced there.

5. An apparatus for super-saturating with carbon dioxide under pressure, liquids such as wine and maintaining those liquids under gaseous pressure, comprising a fluid-tight pressure resisting tank or reservoir, an inlet for carbon dioxide under pressure at the upper part, another inlet for carbon dioxide under pressure at the lower part, means for regulating the pressure at will, at each of these inlets, a closable pipe fitting at the upper end plate for introducing liquid in the tank and a diffuser which divides the tank in two equal superposed parts and is formed of a rigid plate finely perforated for dividing the compressed liquid into a fine cloud, towards the lower half of the tank where it will intimately mix with the dioxide introduced there.

6. An apparatus for super-saturating with carbon dioxide under pressure, liquids such as wine and maintaining those liquids under gaseous pressure, comprising a fluid-tight pressure resisting tank or reservoir, an inlet for carbon dioxide under pressure at the upper part, another inlet for carbon dioxide under pressure at the lower part, means for regulating the pressure independently at each of these inlets in order to have at the upper inlet a higher pressure than at the lower inlet, non-return valves in each of said inlets, a closable fitting at the upper end plate for introducing liquid in the tank, a cock with hand grip at the upper end plate, connected to a tube extending near the bottom end plate, a valve at the upper end plate, operable from outside to momentarily put the inside of the tank in communication with the exterior, and a perforated partition dividing the tank in two equal superposed parts, this partition being perforated by a multitude of holes of such fineness as to prevent flow of liquid from one part of the tank to the other except by unbalanced pressure in the respective parts, the liquid received in the upper part being forced towards the under part, through said holes, by the predominant pressure in the upper part, and being divided by said holes in a very fine cloud.

7. An apparatus for super-saturating with carbon dioxide under pressure, liquids such as wine and maintaining those liquids under gaseous pressure, comprising a fluid-tight pressure resisting tank or reservoir, carried by two diametrically opposed journals fitted at mid-height and resting on stationary supports in which they can rotate to allow to reverse the tank upside down, an inlet for carbon dioxide under pressure at the upper part, another inlet for carbon dioxide under pressure at the lower part, means for regulating the pressure independently at each of these inlets in order to have at the upper inlet a higher pressure than at the lower inlet, non-return valves in each of said inlets, a closable fitting at the upper end plate for introducing liquid in the tank, a cock with hand grip at the upper end plate, connected to a tube extending near the bottom end plate, a valve at the upper end plate, operable from outside to momentarily put the inside of the tank in communication with the exterior, and a perforated partition dividing the tank in two equal superposed parts, this partition being perforated by a multitude of very fine holes through which the liquid admitted in the upper part of the tank can only flow under pressure in the upper part of the tank exceeding the pressure in the lower part of the tank, the liquid received in the upper part being forced towards the under part, through said holes, by the predominant pressure in the upper part, and being divided by said holes in a very fine cloud.

PIERRE FROLOIS.